UNITED STATES PATENT OFFICE.

EDMUND K. MUSPRATT, OF SEAFORTH HALL, NEAR LIVERPOOL, COUNTY OF LANCASTER, AND GEORG ESCHELLMANN, OF NORTHWICH, COUNTY OF CHESTER, ENGLAND.

MANUFACTURE OF POTASSIUM CHLORATE.

SPECIFICATION forming part of Letters Patent No. 388,997, dated September 4, 1888.

Application filed April 17, 1888. Serial No. 270,932. (No specimens.) Patented in England October 31, 1883, No. 5,168; in Germany November 6, 1883, No. 27,730; in Belgium November 12, 1883, No. 63,187; in France November 12, 1883, No. 157,420, and in Austria-Hungary January 7, 1884, No. 43,021 and No. 57,674.

*To all whom it may concern:*

Be it known that we, EDMUND KNOWLES MUSPRATT, a subject of the Queen of Great Britain and Ireland, and GEORG ESCHELLMANN, Ph. D., a subject of the Emperor of Germany, and residing, respectively, at Seaforth Hall, near Liverpool, in the county of Lancaster, and Northwich, in the county of Chester, both in the Kingdom of England, have invented certain Improvements in the Manufacture of Chlorate of Potash and in the Treatment of the Mother-Liquor Resulting Therefrom, (for which we have obtained patents in Great Britain, No. 5,168, dated October 31, 1883; in Germany, No. 27,730, dated November 6, 1883; in Belgium, No. 63,187", dated November 12, 1883, addition; in France, No. 157,420, dated November 12, 1883, addition, and in Austria-Hungary, No. 57,674, Hungary dated January 7, 1884, No. 43,021; Austria, dated January 7, 1884,) of which the following is a specification.

Our present invention has reference to our prior invention for which we obtained British Letters Patent No. 3,960, dated the 15th day of August, 1883; and our said present invention has for its object to effect improvements in the process constituting our said prior invention, wherein magnesia is substituted for lime for the absorption of chlorine gas.

The magnesia is mixed with water and kept in suspension therein by agitation and treated with chlorine gas, as is the case with the process constituting our aforesaid invention. The produce is liquor containing magnesium chlorate and magnesium chloride in the proportion of from about five to five and one-half equivalents of the latter to one of the former. According to the present invention this liquor is boiled down to about from 75° to 80° Twaddle, and magnesium chloride is crystallized out by cooling, leaving behind a liquor containing one equivalent of magnesium chlorate to about four equivalents of magnesium chloride. This improved magnesium-liquor is then heated with potassium chloride and decomposed into potassium chlorate and magnesium chloride, after which potassium chlorate is separated from the magnesium chloride by crystallization, leaving behind a mother-liquor still containing potassium chlorate, but in such small proportions (about five per cent. to ten per cent. of the total chlorate) as to render its recovery as chlorate unprofitable. This mother-liquor is now treated with hydrochloric acid and steam, by which the potassium chlorate is decomposed into chlorine and potassium chloride. The chlorine may be utilized by absorption by magnesia or lime, as may be found convenient. The remaining liquor, containing an excess of hydrochloric acid, is then neutralized with magnesium carbonate, and then consists (with the exception of a very small quantity of potassium chloride) of magnesium chloride, which is boiled down to from about 85° to about 90° Twaddle and allowed to cool and solidify, and thus is made available for sale or for further use (as magnesia) by reheating it in any known way, so as to convert it into magnesia contaminated with a small quantity of magnesium chloride, which contamination will not prevent our using the magnesia over again in our process.

Having now described and particularly ascertained the nature of our said invention and the manner in which the same is or may be used or carried into effect, we would observe, in conclusion, that we do not confine ourselves to the exact proportions and densities above set forth, as they may be varied according to circumstances and conditions.

What we consider to be novel and original, and therefore claim as the invention secured to us by the hereinbefore in part recited Letters Patent, is—

1. In the manufacture of chlorate of potash by means of magnesia and chlorine, the improvement consisting in boiling down the magnesia-liquor to crystallize out magnesium chloride and subsequently heating the said liquor thus improved with potassium chloride, substantially as described.

2. The treatment of the mother-liquor resulting from the manufacture of chlorate of potash, in the manner hereinbefore described, with hydrochloric acid and with steam, so as to obtain chlorine and chloride of magnesium therefrom, substantially as hereinbefore described.

In testimony whereof we have signed our names to this specification in the presence of two subscribing witnesses.

E. K. MUSPRATT.
   GEORG ESCHELLMANN.

Witnesses:
 W. J. SULIS,
  *U. S. Vice-Consul, Liverpool.*
 J. B. EMMONS,
  *U. S. Consulate, Liverpool.*